(12) United States Patent
Floersch et al.

(10) Patent No.: US 7,369,401 B1
(45) Date of Patent: May 6, 2008

(54) DISPLAY MONITOR MOUNTING APPARATUS

(76) Inventors: Peter J. Floersch, 1289 Wilderness Curve, Eagan, MN (US) 55123; Mark W. Wacker, 1507 Palomino Trail, Eagan, MN (US) 55122; Greg J. Miler, 13389 Georgia Cir., Apple Valley, MN (US) 55124

( * ) Notice: Subject to any disclaimer, the term of this patent is extended or adjusted under 35 U.S.C. 154(b) by 219 days.

(21) Appl. No.: 11/043,348

(22) Filed: Jan. 26, 2005

Related U.S. Application Data

(60) Provisional application No. 60/556,630, filed on Mar. 26, 2004.

(51) Int. Cl.
*H05K 7/12* (2006.01)
(52) U.S. Cl. .................. 361/681; 361/682; 292/301
(58) Field of Classification Search ............ 361/681, 361/682; 292/301
See application file for complete search history.

(56) References Cited

U.S. PATENT DOCUMENTS

| | | | | |
|---|---|---|---|---|
| 1,944,450 | A * | 1/1934 | Myers | 292/224 |
| 5,813,793 | A * | 9/1998 | Baucom | 403/325 |
| 5,904,328 | A * | 5/1999 | Leveridge et al. | 248/124.1 |
| 7,061,754 | B2 * | 6/2006 | Moscovitch | 361/683 |
| 2004/0011932 | A1 * | 1/2004 | Duff | 248/157 |

* cited by examiner

*Primary Examiner*—Jayprakash Gandhi
*Assistant Examiner*—Ingrid Wright
(74) *Attorney, Agent, or Firm*—Haugen Law Firm PLLP

(57) ABSTRACT

A display monitor mounting apparatus for operably securing one or more display monitors thereto includes a support bar having an exterior surface configuration that is matingly engageable to a specific latch element, the latch element being configured as an interfacial piece between the support bar and a respective display monitor, and which provides a quick-connect removable engagement mechanism for selectively engaging the respective display monitor to the support bar.

9 Claims, 5 Drawing Sheets

DISPLAY MONITOR MOUNTING APPARATUS

CROSS-REFERENCE TO RELATED APPLICATION

This application claims priority from U.S. provisional application Ser. No. 60/556,630, filed on Mar. 26, 2004 and entitled DISPLAY MONITOR MOUNTING APPARATUS, the contents of which is incorporated herein in its entirety.

FIELD OF THE INVENTION

The present invention relates to display monitor mounting systems generally, and more particularly to a display monitor mounting apparatus that provides for a quick-connect characteristic of a display monitor to a mounting stand or other mounting structure. The quick-connect feature facilitates the removable and slidable engagement of display monitors to support structures such as a support bar coupled to a monitor stand or to a support structure such as a vertical wall or the like.

BACKGROUND OF THE INVENTION

Display monitors such as computer monitors, television screens, and the like find widespread use in various applications, both in the home and at the office. With the advent of display imaging technologies that eliminate the need for relatively bulky cathode ray tubes (CRTs), many such display monitors are significantly smaller in dimension and weight, and may therefore be supported above, for example, a desktop surface.

The relatively small size and weight of such recently developed display monitors has enabled the utilization of relatively light duty support structures to support the display monitors in an elevated position above a desktop. By doing so, desktop space is cleared for other purposes, and the display monitors may be held in a position that is more convenient for viewing by one or more users. Such relatively light-duty support structures include, for example, free-standing assemblies that utilize a weighted base and an upstanding member extending from the weighted base, as well as wall-mounted structures having one or more support members extending outwardly therefrom.

Although a variety of such display monitor support assemblies have been developed and implemented to date, such assemblies typically require the display monitor to be either fixedly secured to the support assembly, or be attached thereto in such a manner so as to make removal of the display monitor from the support assembly cumbersome. In addition, conventional display monitor support assemblies typically incorporate fixed display monitor receiving locations, in that only a pre-defined number of display monitors may be attached to a given display monitor support assembly.

It is therefore a principal object of the present invention to provide a display monitor mounting apparatus that utilizes quick-connect units for conveniently and removably securing one or more individual display monitors to the mounting apparatus.

It is another object of the present invention to provide quick-connect mounting elements for operably coupling a display monitor to a support structure in a hands-free procedure.

It is a still further object of the present invention to provide a display monitor mounting apparatus having quick-connect mounting elements that enable both removable and slidable securement of one or more display monitors to the mounting apparatus.

It is a still further object of the present invention to provide a display monitor mounting apparatus having latch elements that interface between respective display monitors and the mounting apparatus, and which latch elements enable operable connection to the mounting apparatus via a hands-free procedure, and disengagement from such mounting apparatus through a single-step procedure.

It is another object of the present invention to provide a display monitor mounting apparatus having one or more interfacial latch elements that provide convenient removable attachment of respective display monitors to the mounting apparatus, as well as pivotal movement of the respective display monitors while in an engaged relationship with the mounting apparatus.

SUMMARY OF THE INVENTION

By means of the present invention, one or more display monitors may be selectively and removably secured to a support structure without manual manipulation of distinct connection elements. Specifically, a user may selectively attach one or more monitors respectively having a latch element of the present invention coupled thereto to a correspondingly configured support bar by merely maneuvering the monitor/latch element combination into a proper orientation on the support bar. As such, the selective mounting of the display monitor may be accomplished "hands-free", that is, without manual manipulation of distinct connection elements while simultaneously supporting the display monitor. The combination of the latch element and the support bar of the present invention thereby provides a quick-connect assembly for conveniently mounting one or more display monitors to a support structure.

In a particular embodiment of the present invention, the display monitor mounting apparatus includes a support bar that is configured for operable attachment to a support structure and has a first length along a central longitudinal axis thereof and an outer surface. The outer surface includes a channel and an elongated detent portion disposed therein, with the channel and the elongated detent portion being spaced apart about the outer surface and extending substantially parallelly along at least a portion of the first length of the support bar. The mounting apparatus further includes a latch element that is removably securable to the support bar, with the latch element having a first bar coupling portion and a second monitor mounting portion. The bar coupling portion preferably has a protrusion configured for mating engagement with the elongated detent portion of the support bar, and a retractable plunger for operably extending into the channel when the latch element is properly coupled to the support bar. This latch element secures the bar coupling portion to the bar. The second monitor mounting portion preferably includes a mounting plate that is sized and configured to operably mount a display monitor thereto.

DETAILED DESCRIPTION OF THE PREFERRED EMBODIMENTS

The objects and advantages enumerated above together with other objects, features, and advances represented by the present invention will now be presented in terms of detailed embodiments described with reference to the attached drawing figures which are intended to be representative of various possible configurations of the invention. Other embodiments and aspects of the invention are recognized as being within the grasp of those having ordinary skill in the art.

Figure 1:
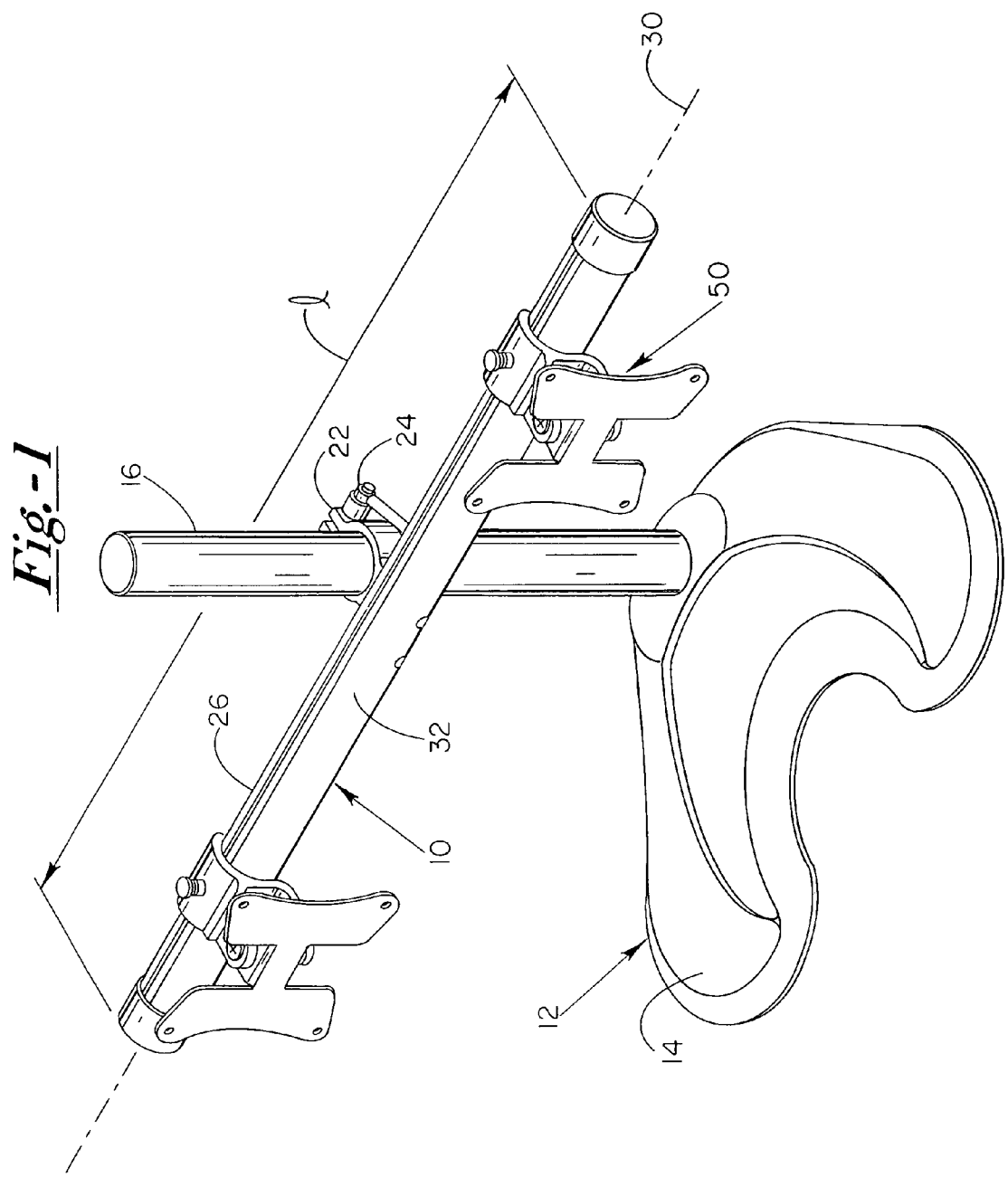
FIG. 1 is a perspective view of a display monitor mounting apparatus of the present invention being operably secured to a support structure.

With reference now to the drawing figures, and first to FIG. 1, a display monitor mounting apparatus 10 is shown being coupled to a base oriented support structure 12 having a base member 14 and a support member 16 extending upwardly therefrom. In the embodiment illustrated in FIG. 1, mounting apparatus 10 is specifically configured for mating engagement with support member 16 via post adapted member 22 attached to support bar 26 of mounting apparatus 10. A manual tightening means 24 is provided in the embodiment of FIG. 1 for selectively locking support bar 26 at a predetermined vertical position on support member 16.

Though display monitor apparatus 10 of the present invention is illustrated in FIG. 1 as being utilized in combination with a stand oriented support structure 12, it is contemplated by the present invention that mounting apparatus 10 be utilized in combination with various support structures, including support members extending from an upstanding wall surface, and the like. Preferably, however, support bar 26 is adjustably positionable on any support structure such as structure 12 so as to allow for vertical adjustability of support bar 26 with respect to a desktop surface.

As stated above, display monitor mounting apparatus 10 includes a support bar 26 having a first length "$\ell$" along a central longitudinal axis 30 thereof. Support bar 26 has an outer surface 32 substantially radially disposed about longitudinal axis 30. In other embodiments of the present invention, however, outer surface 32 may be of any desired configuration, including rectangular, oblong, or other configurations useful in particular applications.

Figure 2:
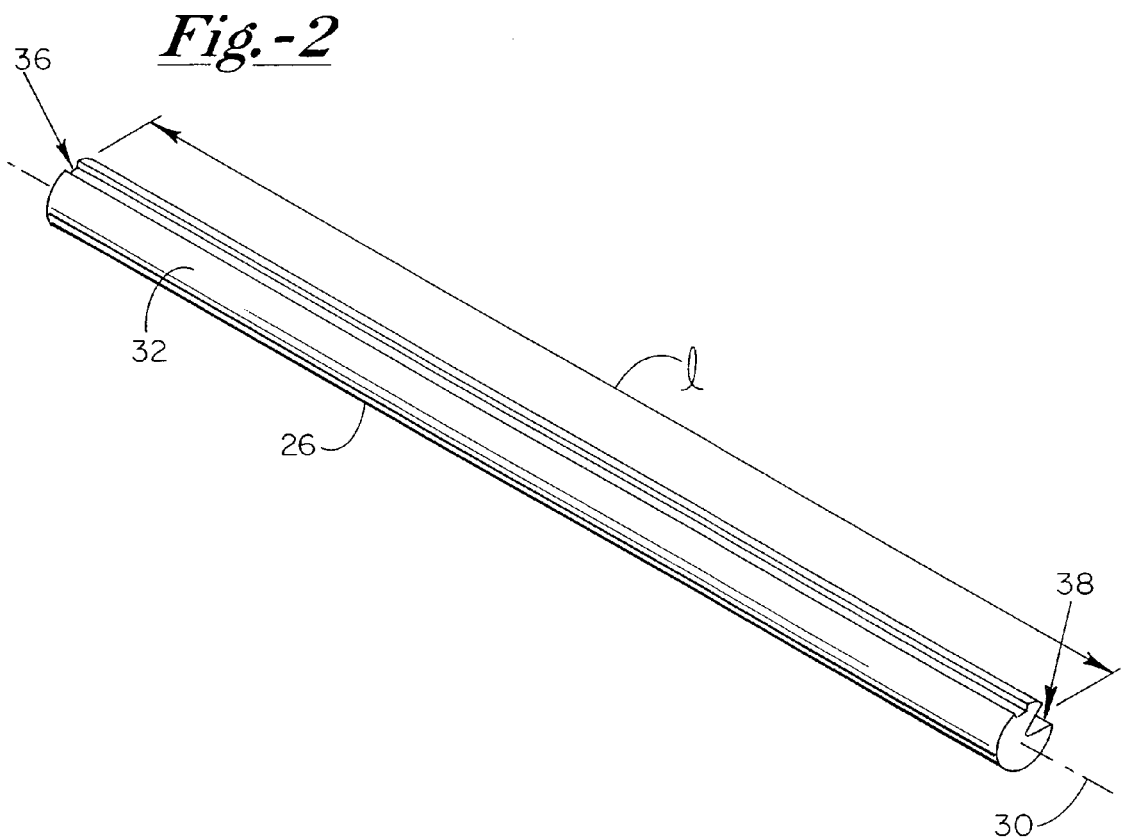
FIG. 2 is a perspective isolation view of a support bar element of the mounting apparatus of the present invention.
Figure 3:
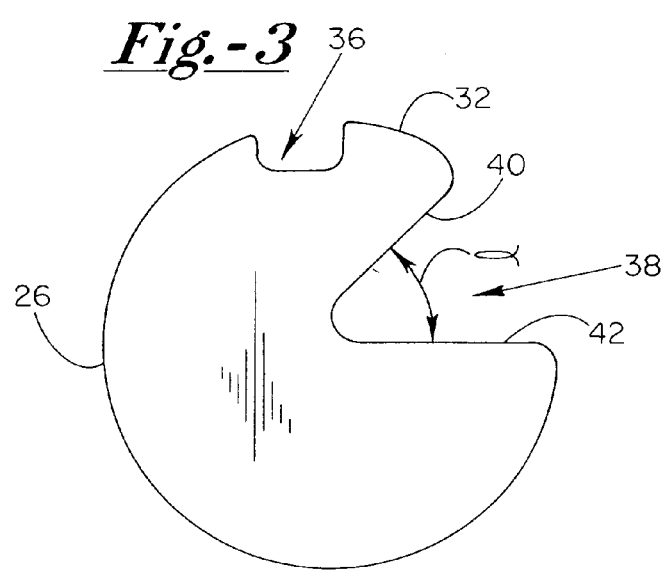
FIG. 3 is an end view of the support bar element illustrated in FIG. 2.

As best depicted in the isolation perspective view of FIG. 2 and the isolation end view of FIG. 3, support bar 26 includes a channel 36 and an elongated detent portion 38 disposed therein and being spaced apart about outer surface 32 of support bar 26. Channel 36 and elongated detent portion 38 preferably parallely extend along at least a portion of first length "$\ell$" of support bar 26. As such, channel 36 and elongated detent portion 38 may extend along the entire first length "$\ell$", or may alternatively extend in one or more discrete sections therealong.

Elongated detent portion 38 is preferably formed with a substantially wedge-shaped cross-section, such that first and second detent surfaces 40, 42 are disposed in angular facing relationship with one another. Preferably, angle "$\alpha$" defined between first and second detent surfaces 40, 42 is between about 10° and about 60°. Though elongated detent portion 38 is illustrated in FIG. 3 as being substantially wedge-shaped, a wide variety of other configurations therefor are contemplated by the present invention. As described hereinbelow, elongated detent portion 38 is preferably configured to matingly engage with first bar coupling portion 52 of quick-connect latch element 50 for releasably retaining latch element 50 to support bar 26. Accordingly, elongated detent portion 38 may have any desired configuration that matingly engages with a designated portion of latch element 50 in a manner which removably secures latch element 50 in a position about support bar 26.

Figure 4:
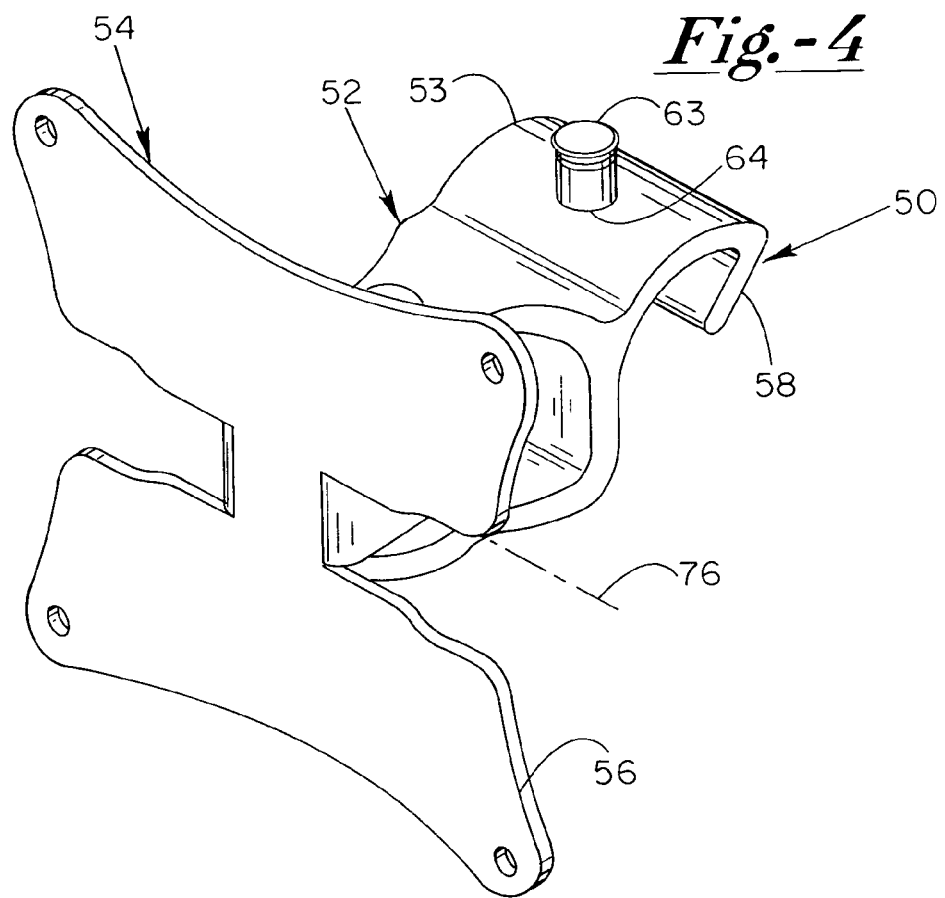
FIG. 4 is an isolation perspective view of a latch element of the mounting apparatus of the present invention.
Figure 5:
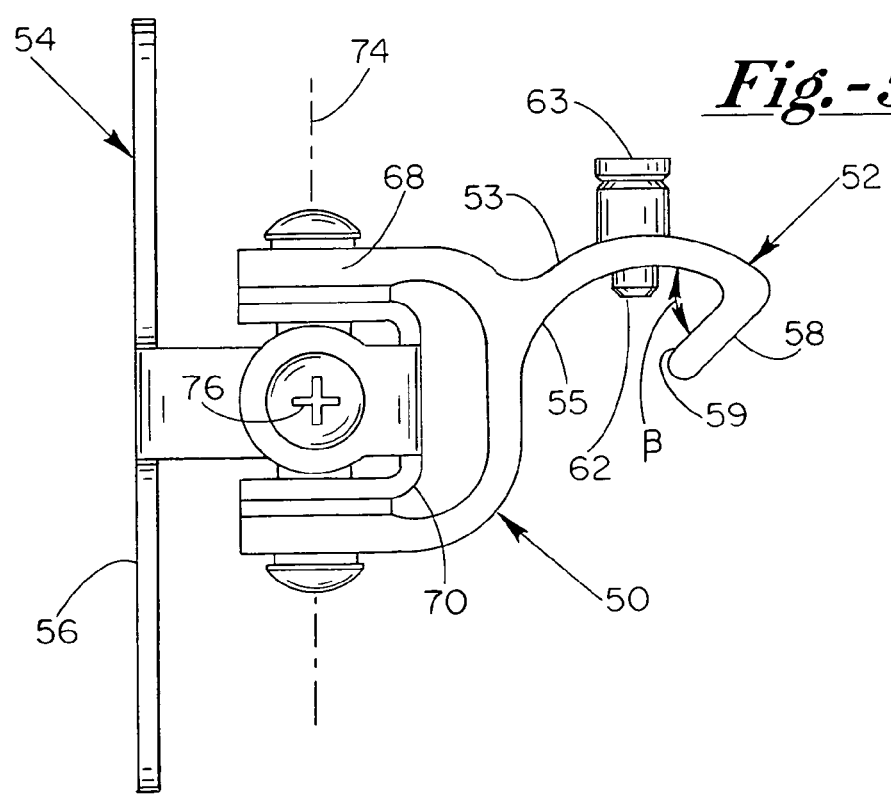
FIG. 5 is a side view of the latch element illustrated in FIG. 4.

As illustrated in the isolation views of FIGS. 4 and 5, quick-connect latch element 50 includes a bar coupling portion 52 and a monitor mounting portion 54. Bar coupling portion 52 preferably includes a protrusion 58 that is specifically configured for mating engagement with elongated detent portion 38 of support bar 26. As best illustrated in FIG. 5, protrusion 58 preferably forms an acute angle "$\beta$" with extension arm portion 53 of bar coupling portion 52 so that the force exerted against inner surface 59 of protrusion 58 by first detent surface 40 of support bar 26 in the operable engagement of latch element 50 upon support bar 26 is substantially perpendicular to inner surface 59, thereby minimizing inertial moments tending to disengage protrusion 58 from within detent portion 38 of support bar 26.

Bar coupling portion 52 preferably further includes a retractable plunger 62 that is specifically positioned at arm portion 53 and configured for operably extending into channel 36 of support bar 26 when latch element 50 is properly coupled to support bar 26. Retractable plunger 62 is preferably spring biased into an extended position as illustrated in FIG. 5, which spring bias may be overcome by manually pulling on handle 63 to thereby retract plunger 62 into aperture 64 of arm 53. As shown in the assembled illustration of FIG. 7, the spring biased retractable plunger 62 extends into channel 36 of support bar 26 when latch element 50 is operably coupled to support bar 26. In doing so, retractable plunger 62 assists in locking bar coupling portions 52 in place about support bar 26. In addition, retractable plunger 62 serves as a guide within channel 36 for the relative slidable engagement between latch element 50 and support bar 26. In other words, latch element 50 may be operably slid axially along support bar 26 in a controlled fashion via the guiding characteristic of retractable plunger 62 being operably engaged with channel 36. To disengage latch element 50 from support bar 26, retractable plunger 62 is retracted into aperture 64 of arm 53, so that latch element 50 is able to be rotated in such a manner so as to release protrusion 58 from mating engagement in elongated detent portion 38.

With reference back to FIG. 5, monitor mounting portion 54 preferably includes a mounting plate 56 that is specifically configured to operably mount to a display monitor, and particularly to a rear surface of the respective display monitor. Accordingly, each latch element 50 is configured to operably receive and thereby mount the respective display monitor thereto at mounting plate 56.

In preferred embodiments of the present invention, monitoring mounting portion 54 is pivotally coupled to first bar coupling portion 52 of latch element 50. To effect such a pivoting characteristic, first and second hinges 68, 70 are provided which each define a respective axes of rotation. Specifically, first hinge 68 defines a substantially vertical axis 74, while second hinge 70 defines a substantially horizontal axis 76. Mounting plate 56 is coupled to first and second hinges 68, 70 so as to operably pivot about either or both of vertical and/or horizontal axes 74, 76. In such a manner, mounting plate 56 may operably pivot in any desired direction so as to set the operably attached monitor in a viewing position most desired by the user.

In a particularly preferred embodiment of the present invention, outer surface 32 of support bar 26 is substantially radially disposed about longitudinal axis 30. In order to best conform to outer radial surface 32 of support bar 26, inner surface 55 of extension arm portion 53 is preferably correspondingly curved about a radius substantially equal to the radius of support bar 26 about longitudinal axis 30. Such corresponding curvature radii assist in securely engaging latch element 50 about support bar 26.

Figure 6:
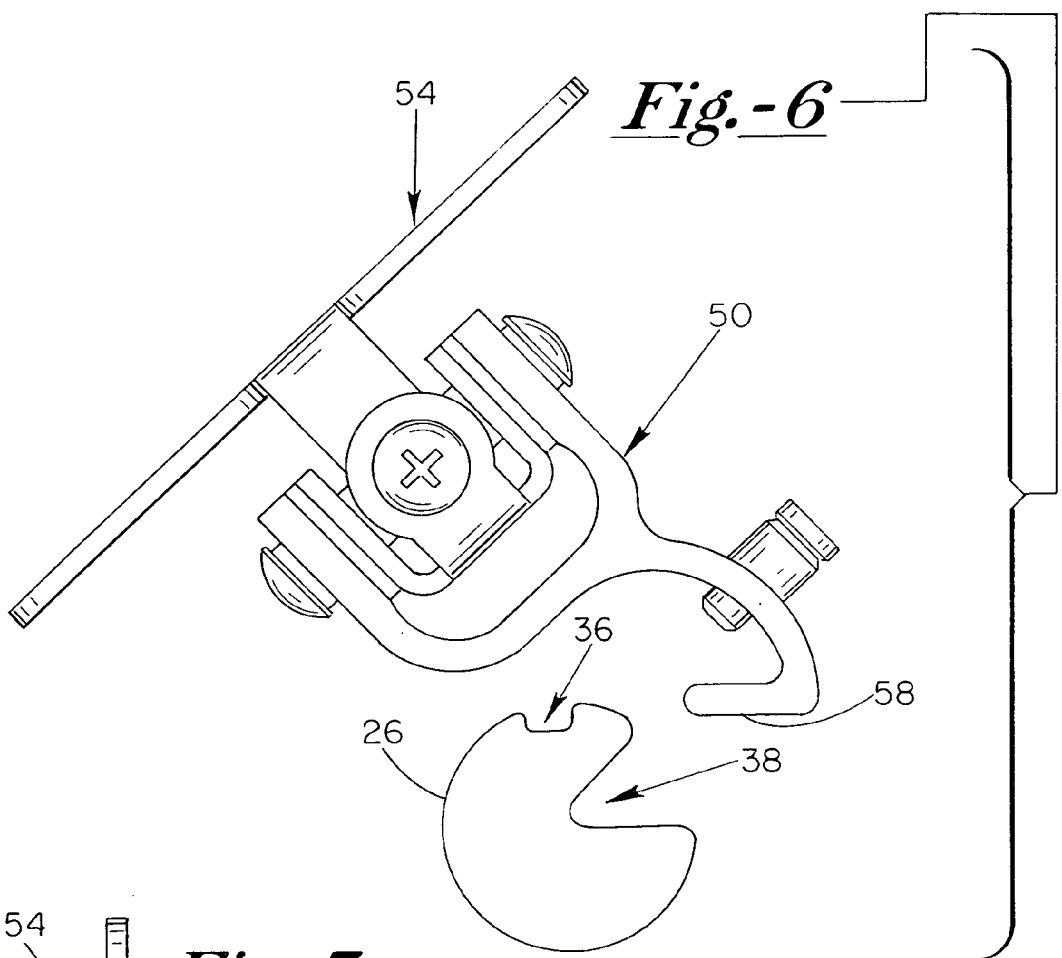
FIG. 6 is a side view illustrating a latch element being operably coupled to a support bar of the present invention.
Figure 7:
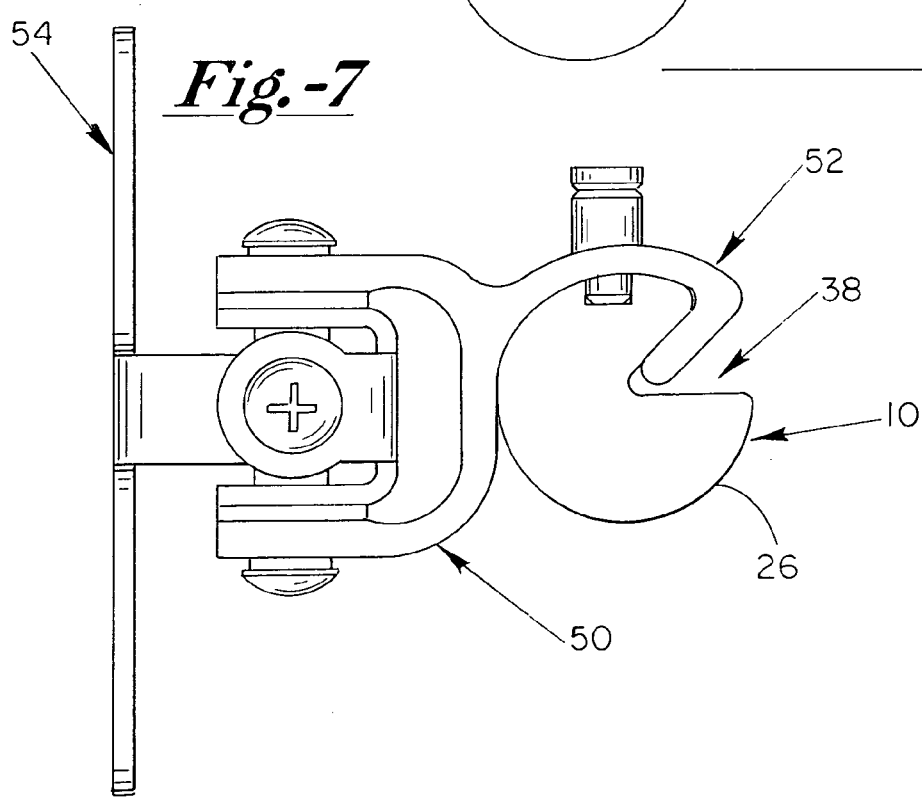
FIG. 7 is a side-elevational view of a display monitor mounting apparatus of the present invention.

With attention being drawn to FIGS. 6 and 7, a sequential representation of the operable engagement of latch element 50 and support bar 26 is shown. Latch element 50 (preferably with a respective monitor operably coupled thereto) is operably and removably secured to support bar 26 by inserting protrusion 58 into elongated detent portion 38, and subsequently rotating latch element 50 about longitudinal axis 30 of support bar 36 until retractable plunger 62 extends into channel 36 as a result of the spring bias force described above. Once retractable plunger 62 is located in channel 36, latch element 50 is releasably secured about support bar 26. In operation, such an engaging procedure may preferably be completed while the user grasps only the respective monitor that is operably coupled to mounting plate 56. In such a manner, the display monitor may be mounted to mounting apparatus 10 without specific manual manipulation of any clamping elements. The display monitor may thereby be installed "hands-free" by simply maneuvering the monitor having the operably attached latched element in a manner described above and depicted in FIGS. 6 and 7 of the drawings. Such a mounting methodology is a distinct advantage over presently known systems, in that the user need not simultaneously hold the monitor in a desired position and manually manipulate attachment mechanisms. Accordingly, the mounting apparatus 10 of the present invention enables a user to conveniently and quickly attach one or more monitors to a support structure.

The mounting apparatus of the present invention further enables convenient detachment and relocation means, in that the user need only pull upon handle 63 to retract plunger 62 into aperture 64, and to subsequently rotate the combination of the monitor and latch element 50 in a rearward direction. As such, the respective coupled monitor may be easily removed from support bar 26 and repositioned upon a separate support bar 26 or otherwise disposed of.

An additional aspect of the present invention is in the enablement of a slidable attachment of latch element 50 to support bar 26, thereby allowing a user to slide a coupled monitor along first length "ℓ" of support bar 26 as guided by plunger 62 in channel 36.

Moreover, the configuration of the present invention is not limiting in its adaptability to a plurality of distinct latch elements, and therefore a plurality of distinct display monitors. In other words, a single support bar 26 may operably support a plurality of distinct display monitors at nearly any desired location thereof. Through such a characteristic, users are able to set up multiple monitor displays in arrangements most convenient to them. As an extension of the embodiment described with reference to the drawings, a plurality of support bars 26 may be utilized in combination with the associated support structure, thereby enabling the removable and slidable attachment of a multitude of display monitors at respective desired positions on the one or more support bars 26. A particular example application which finds the ability to operably and removably mount a multitude of distinct display monitors to a single mounting apparatus is in financial analyst set ups wherein the user desires to simultaneously view distinct displays from a single location. The mounting apparatus of the present invention not only allows such a user to both selectively position a plurality of monitors along one or more support bars, but to also selectively pivot each individual monitor into a relative orientation most desired by the user.

Figure 1A:
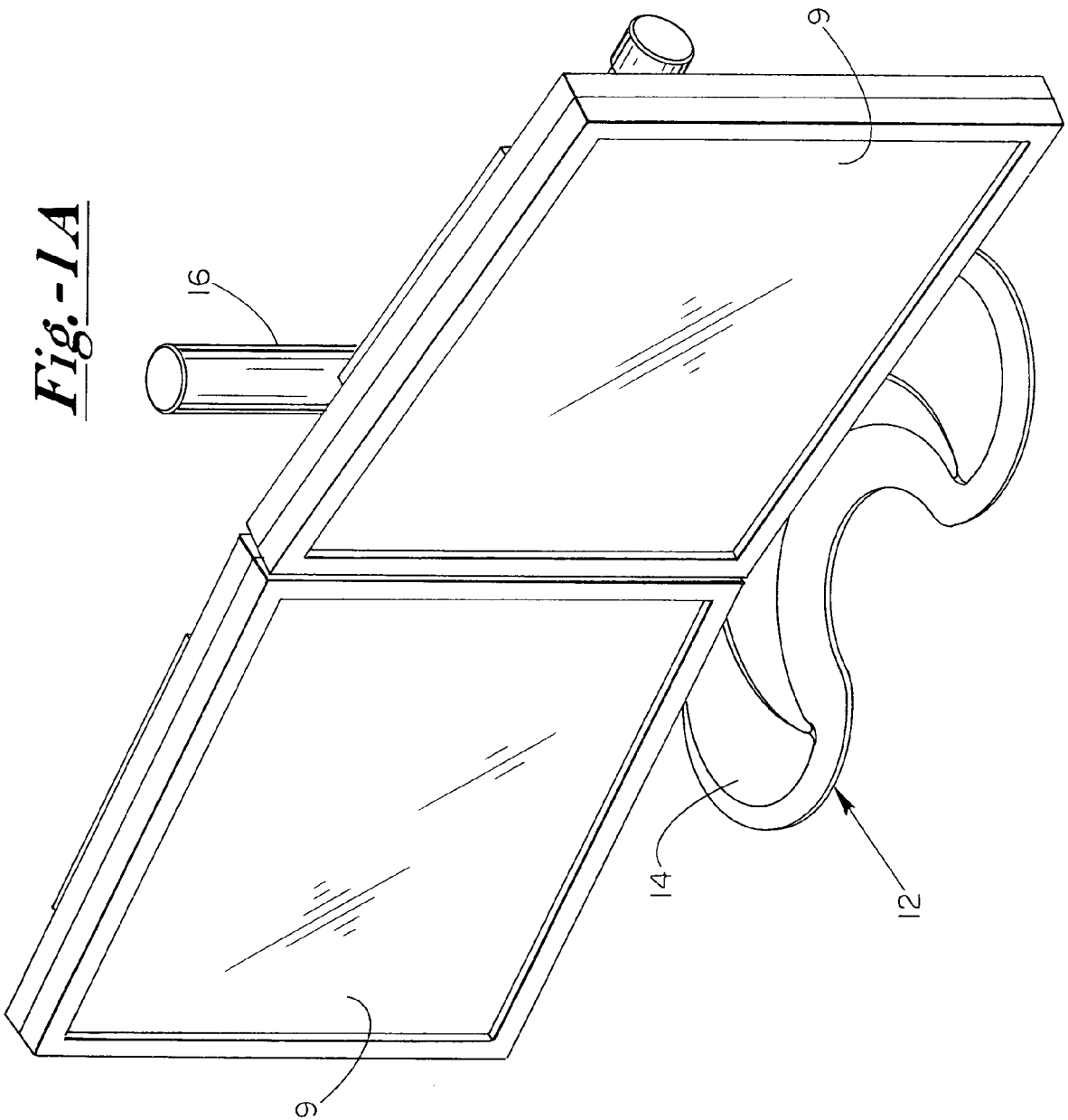
FIG. 1A is a perspective view of the display monitor mounting apparatus illustrated in FIG. 1, including display monitors.

The embodiment of FIG. 1 is illustrated in FIG. 1A having display monitors 9 coupled to respective ones of latch element 50.

The invention has been described herein in considerable detail in order to comply with the patent statutes, and to provide those skilled in the art with the information needed to apply the novel principles and to construct and use embodiments of the invention as required. However, it is to be understood that the invention can be carried out by specifically different devices and that various modifications can be accomplished without departing from the scope of the invention itself.

What is claimed is:

1. A display monitor mounting apparatus for operably securing one or more display monitors thereto, said mounting apparatus comprising:
   (a) a support bar being configured for operable attachment to a support structure and having a first length along a central longitudinal axis thereof and an outer surface, said outer surface having a channel and an elongated detent portion disposed therein, said channel and said elongated detent portion being spaced apart about said surface and extending substantially parallelly along at least a portion of said first length of said support bar; and
   (b) a latch element that is removably securable to said support bar, said latch element having a first bar coupling portion and a second monitor mounting portion, said bar coupling portion having a protrusion configured for mating engagement with said elongated detent portion of said support bar, and a spring-biased retractable plunger for biasably extending into said channel under bias force when said latch element is properly coupled to said support bar, said second monitor mounting portion including a mounting plate that is sized and configured to operably mount a display monitor thereto.

2. A display monitor mounting apparatus as in claim 1 wherein said elongated detent portion has a wedge-shaped cross-section forming first and second detent surfaces in angular facing relationship with one another, the angle formed between said first and second detent surfaces being between about 10° and about 60°.

3. A display monitor mounting apparatus as in claim 2 wherein said protrusion of said bar coupling portion operably bears against said first detent surface when said latch means is operably coupled to said support bar.

4. A display monitor mounting apparatus as in claim 2 wherein said outer surface of said support bar is radially disposed about said central longitudinal axis.

5. A display monitor mounting apparatus as in claim 4 wherein at least a section of an inner surface of said bar coupling portion that is in contact engagement with said outer radial surface of said support bar during operable engagement of said latch element to said support bar has a first curvature radius substantially equal to a second curvature radius of said outer surface of said support bar.

6. A display monitor mounting apparatus as in claim 1 wherein said mounting plate is pivotally coupled to said first bar coupling portion of said latch element.

7. A display monitor mounting apparatus as in claim 1 wherein said retractable plunger is manually retractable against its spring bias from a position within said channel.

8. A display monitor mounting apparatus for operably securing one or more display monitors thereto, said mounting apparatus comprising:

(a) a support bar being configured for operable attachment to a support structure and having a first length along a central longitudinal axis thereof, an outer surface of said support bar having an elongated detent portion disposed therein and extending along at least a portion of said first length of said support bar, said elongated detent portion having a wedge-shaped cross-section forming first and second detent surfaces extending in angular relationship with one another from an apex, with a fictitious line drawn along said first detent surface from said apex toward said outer surface extending generally away from the one or more display monitors when such one or more display monitors are operably secured to said display monitor mounting apparatus;

(b) a latch element that is removably securable to said support bar, said latch element having a first bar coupling portion and a second monitor mounting portion, said bar coupling portion having a protrusion configured for mating engagement with said elongated detent portion of said support bar by operably bearing against said first detent surface, said second monitor mounting portion including a mounting plate that is sized and configured to operably mount a display monitor thereto.

9. A display monitor mounting apparatus for operably securing one or more display monitors thereto, said mounting apparatus comprising:

(a) a support bar being configured for operable attachment to a support structure and having a first length along a central longitudinal axis thereof, an outer surface of said support bar having a channel and an elongated detent portion disposed therein, said channel and elongated detent portion being spaced apart about said surface and extending substantially parallelly along at least a portion of said first length of said support bar; and (b) a latch element that is removably securable to said support bar, said latch element having a first bar coupling portion and a second monitor mounting portion, said bar coupling portion having an arm section extending away from said monitor mounting portion and terminating in a protrusion that is configured for mating engagement with said elongated detent portion of said support bar, said arm section further including an aperture that is arcuately spaced from said protrusion by between about 20° and about 90°, said bar coupling portion further including a retractable plunger for operably extending into said channel through said aperture when said latch element is properly coupled to said support bar, said second monitor mounting portion including a mounting plate that is sized and configured to operably mount a display monitor thereto.

\* \* \* \* \*